Patented May 23, 1939

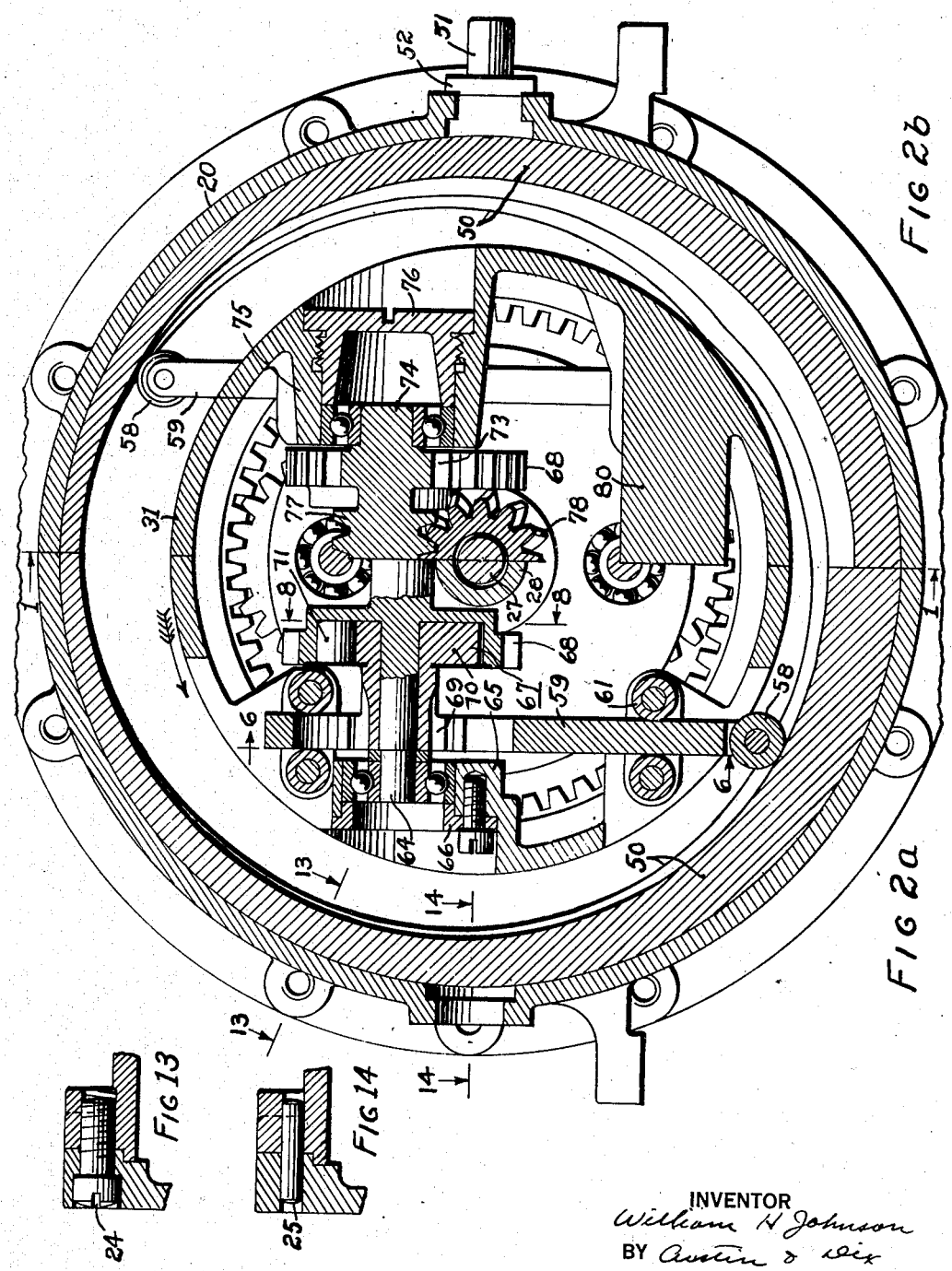

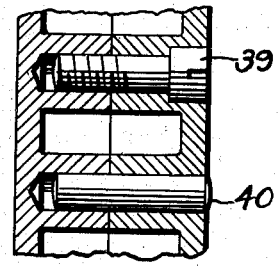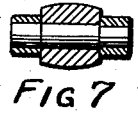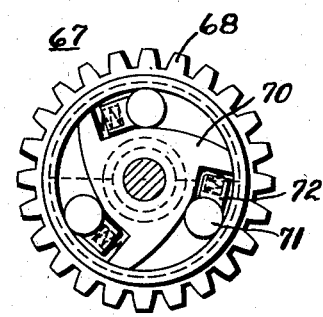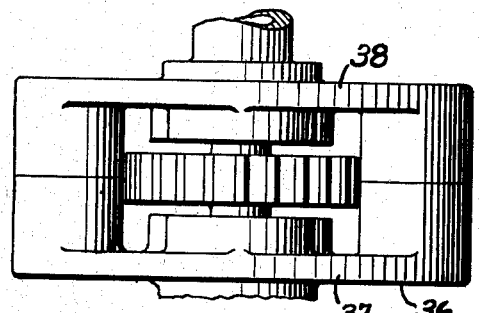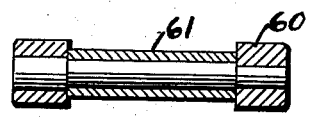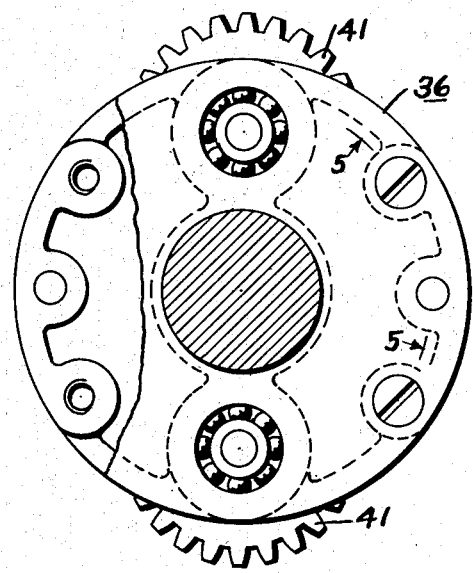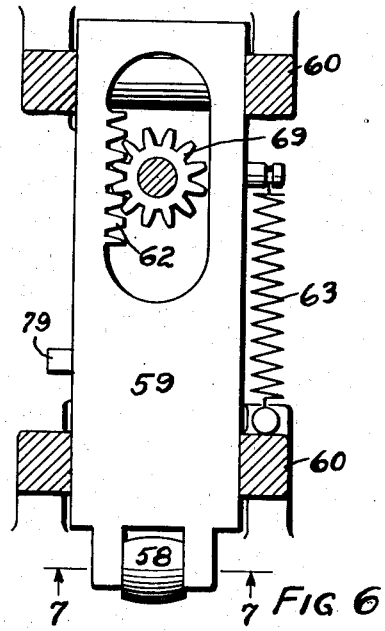

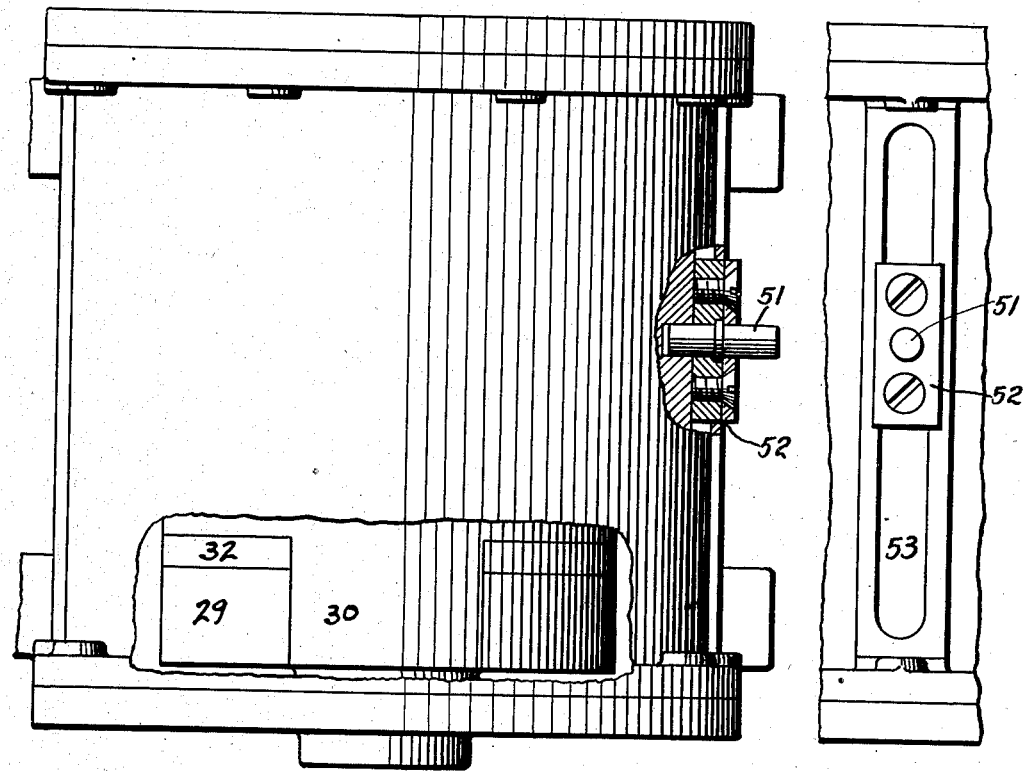
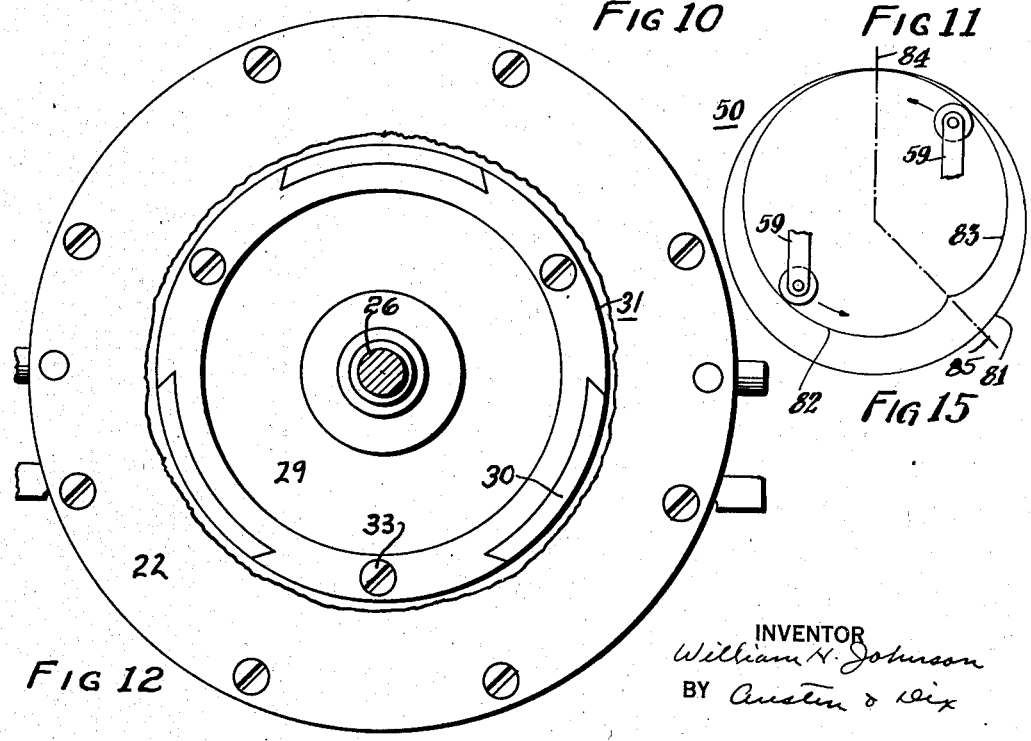

2,159,740

UNITED STATES PATENT OFFICE 2,159,740

VARIABLE SPEED TRANSMISSION

William Horace Johnson, Cranston, R. I., assignor to Weskenson Corporation, Providence, R. I., a corporation of Rhode Island Application March 20, 1935, Serial No. 11,913
Renewed October 18, 1938

11 Claims. (Cl. 74—283)

The invention relates to change speed mechanism, and more particularly to such mechanism whose speed ratio may be infinitely varied.

According to a preferred form of the invention, the drive shaft which is driven by a suitable source of power, and the driven shaft which drives the load, may be connected by a suitable gear system under the control of a control shaft by whose speed the direction of rotation and the speed of the driven shaft is determined, and which gear system may be locked to rotate as a unit with the shafts, in suitable bearings, without relative movement between the parts of the gear system and without contact with external members other than the bearings.

Suitable auxiliary variable speed driving devices may be provided between the drive shaft and the control shaft. For example, a suitable drum casing may be secured to the control shaft and may carry a pair of oscillatory racks mounted at right angles to the main axis, but spaced therefrom. These racks carry follower members which engage a stationary cam member, the character of whose cam surface varies axially. By shifting the cam member, different amounts of oscillatory motion may be imparted to the racks. Also mounted on the drum casing may be three-roll clutches driven by said followers, the three-roll clutches controlling the movement of the control shaft through a worm and worm wheel arrangement.

The internal cam surface of the cam member at all sections has similar cam surfaces, but the throw or eccentricity of the cam surface varies axially to give different amounts of oscillatory motions to the followers. The shape of this cam surface may be such that each follower is driven through an angle substantially larger than 180° so that each follower will take up its driving load before the other follower discontinues its driving action. This causes a smoother driving action and eliminates troubles due to back-lash and wear in the gearing.

The arrangement may be such that for direct drive between the driving and driven shafts, no relative movement takes place in the planetary gear system or in the auxiliary variable speed devices, but all these parts are locked together and rotate as a unit, the control cam being shifted to clear the cam followers. Thus, there is no movement of the intermediate parts of the transmission for direct drive nor any drag on the transmission, thereby eliminating wear and tear of the transmission and minimizing friction for direct drive.

According to the invention, the speed ratio may be controlled simply by movement of the single control member. This control member may be operated either manually or by suitable automatic devices responsive to any desired control action. The invention is capable of general application, but it is particularly desirable for use with automobile transmissions and with machines requiring infinitely variable speed ratios.

The invention also consists in certain new and original features of construction and combinations of parts hereinafter set forth and claimed.

Although the novel features which are believed to be characteristic of this invention may be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a longitudinal section taken through the main axis of the transmission;

Fig. 2a is a section taken on the line 2a—2a of Fig. 1;

Fig. 2b is a section taken on the line 2b—2b of Fig. 1;

Fig. 3 is a section on the line 3—3 of Fig. 1 showing the planetary gearing;

Fig. 4 is a top view of Fig. 3;

Fig. 5 is a section on the line 5—5 of Fig. 3 illustrating how the cage of the planetary gearing is secured together;

Fig. 6 is a section on the line 6—6 of Fig. 2a illustrating the construction of the oscillatory racks;

Fig. 7 is a section on the line 7—7 of Fig. 6;

Fig. 8 is a section on the line 8—8 of Fig. 2a illustrating the construction of the one-way clutch;

Fig. 9 is a section on the line 9—9 of Fig. 1 illustrating the sliding rollers for the racks;

Fig. 10 is a plan view of the gearing, with parts of the housing broken away, illustrating features of construction, particularly the manner of operating the stationary cam;

Fig. 11 is a fragmentary side elevation of Fig. 10;

Fig. 12 is an end view of the gearing with part of the head of the housing broken away;

Figure 1:
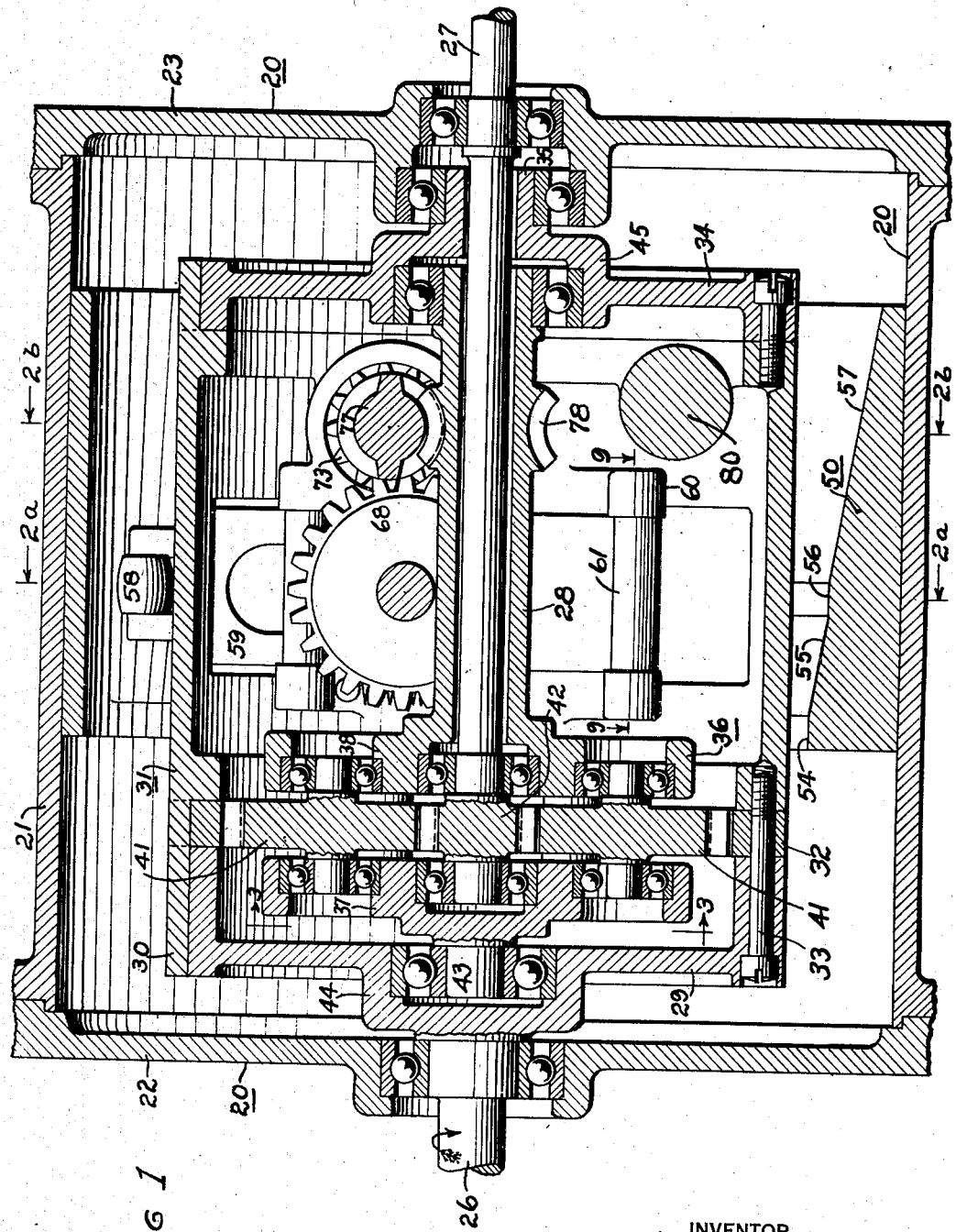

Figs. 13 and 14 are sections on the lines 13—13 and 14—14, respectively, of Fig. 2a illustrating the manner of securing the heads onto the housing for the transmission;

Fig. 15 is a diagrammatic view to assist in illustrating the operation of the cam and followers.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, the transmission is contained within a suitable stationary housing indicated by 20. The drive shaft 26 will be connected to a suitable driving mechanism (not shown) of any type requiring a variable speed drive mechanism, such as the internal combustion engine of an automobile, or an electric motor in the case of metal working machinery or the like. The driven shaft 27 will be connected to the rear wheels in the case of an automobile or to the metal working machine as the case may be. Assuming that the drive shaft 26 rotates at constant speed and in the direction of the arrow in Fig. 1, the speed and direction of rotation of the driven shaft 27 is controlled by the axial position of the cross head 52 (Figs. 2, 10 and 11). The position of this cross head 52 may be controlled by a suitable lever (not shown) either manually or automatically by suitable governing mechanism (not shown).

Referring to Fig. 1, the drive shaft 26 drives a driven shaft 27 through suitable planetary gearing 32, 41 and 42, the planetary gearing being under the control of a control sleeve 28. The control sleeve 28 always rotates in the same direction as the drive shaft 26 with relation to the stationary housing, and its speed controls both the speed and direction of the driven shaft 27. The control sleeve 28 is driven by the drive shaft 26 through variable speed mechanism which is controlled by the position of the cross head 52, as hereinafter described more in detail.

The stationary housing 20 comprises a body 21 having detachable end plates 22 and 23 secured to the body by bolts 24 (Fig. 13) and dowel pins 25 (Fig. 14). The dowel pins 25 are for the purpose of positioning the plates 22 and 23 on the body and the series of bolts 24 are for the purpose of securely fastening the plates 22 and 23 to the body 21 to totally enclose the gearing therein which may operate in a suitable bath of lubricant.

The drive shaft 26 is journalled in a suitable ball bearing in plate 22 and drives a drum casing 31 having heads 29 and 34 secured thereto. The head 29 has a series of slots in which tongues 30 on the drum 31 fit (Fig. 12). An internal ring gear 32 also has slots in which the said tongues 30 fit and a series of bolts 33 clamp the parts rigidly together.

The head 34 has slots receiving tongues (similar to tongues 30) on the other end of the drum casing 31 and a series of bolts are provided to bolt the head 34 to the drum casing 31, as shown. The head 34 has a hub 35 journalled in the plate 23 by ball bearings, as shown. Thus the heads 29 and 34 are rigidly secured to the drum casing and the unitary assembly formed thereby rotates as a unit in the bearings in the plates 22 and 23.

Journalled in the heads 29 and 34 is a cage 36 (Figs. 3 and 4) carrying planet-gears 41 meshing respectively internal gear 32 and pinion 42 on the driven shaft 27. The cage 36 comprises a pair of plates 37 and 38 secured together by bolts 39 and pins 40 (Fig. 5). The planet-gears 41 are journalled in suitable ball bearings in the cage 36, as shown.

The plate 37 of cage 36 has a hub stud 43 journalled in a hub 44 on the head 29 and the other plate 38 of the cage 36 has the control sleeve 28 secured thereto, the other end of the control sleeve being journalled in a hub 45 of head 34. The cage forms a complete assembly rotatably supported in the heads 29 and 34.

From the description thus far, it will be seen that, as the drive shaft 26 rotates in the direction of the arrow in Fig. 1, it will drive the driven shaft 27 through gears 32, 41 and 42, the direction of rotation and the speed of driven shaft 27 depending upon the speed of rotation of the control sleeve 28 which is driven in a manner to be described.

For driving the control sleeve 28 a large control cam 50 is provided, this cam being slidable axially along the main axis of the transmission by a suitable lever or other device cooperating with studs 51 (Figs. 10 and 11), set in cross heads 52 slidable in ways 53 formed in the body 21 of the housing.

The cam 50 is operatively stationary in any adjusted position and has eccentric cam surfaces indicated by 53, 55, 56 and 57 for purposes described hereinafter. While these cam surfaces vary in eccentricity or throw, the cam surface at any particular point is in the shape illustrated particularly in Figs. 2 and 15. The shape and operation of the cam surfaces will be described hereinafter more in detail.

Cooperating with the cam surfaces on cam 50 are a pair of followers 59 (Fig. 2) having rollers 58 rolling on the said cam surfaces. The followers 59 have internal racks 62 formed thereon (Fig. 6), these rack followers being slidably mounted in suitable ways 60 between suitable rollers 61 (Figs. 6 and 9). Springs 63 are provided for urging the followers 59 against the cam surfaces of cam 50 and stops 79 are provided to limit the outward movement of the followers.

The racks 62 mesh pinions 69 loosely mounted on an auxiliary shaft 64 journalled in bearing holders 65 formed within the drum casing 31. Rings 66, together with suitable bolts, hold the ball assemblies in position. The pinions 69 drive transfer gears 68 through suitable clutches 67 which are similar in construction. Since the clutches 67 are similar, it is only necessary to describe one in detail.

Referring to Fig. 8, it will be seen that each clutch 67 comprises an external gear 68 forming a housing for the inner member 70 which is rigidly secured to the pinion 69. The inner member 70 has suitable wedge recesses which seat rolls 71 which are backed by spring pressed devices 72. These clutches are sometimes known as "three-roll" clutches and act as one-way power transmitting devices. In other words, as each rack 59 oscillates back and forth, the one-way clutches operate to always drive the transfer gears 68 in the same direction.

It will be noted that the two gears 68 are rigidly secured together, these gears driving a pair of transfer gears 73 which are integral with a worm 77, all of which are mounted on a worm shaft 74 suitably journalled in bearing holders 75 formed within the drum casing 31. The ball bearing assemblies are held in position by suitable screw threaded collars 76 as indicated. The worm 77 meshes with the worm wheel 78 integral with, or which may be mounted on the control sleeve 28 and consequently it will be seen from the above description that the oscillatory movement, caused by the followers 59 rotating with the drum casing 31 and working with the cam surface of cam 50, drives the control sleeve 28.

Referring now to Figs. 2 and 15, the nature of the cam surface of cam 50 will be described. The right hand end of the cam surface in Fig. 1 merges into a circle indicated diagrammatically by 81 in Fig. 15. The throw of the cam increases from the right hand end to the left hand end in Fig. 1, lines 82, 83 representing the cross section of the cam at a position intermediate of the ends of cam 50. It will be understood that the low point of the cam at every section thereof is the same. This is indicated by the line 84 in Fig. 15 which represents a plane through the main axis and through the low points of the cam. The high points of the cam at every section thereof will be in the same axial plane indicated by the line 85 in Fig. 15, this point varying, however, in radius with the throw of the cam.

As the drum casing 31, supporting cam followers 59, rotates in the direction of the arrows in Figs. 2 and 15, the cam surface 82 operates to raise the cam followers 59 against their springs. It will be noted particularly from Fig. 15, that the raising operation occurs over an angle of considerably more than 180° from the low point of the cam on line 84 to the high point of the cam on line 85. The cam surface 82 is so arranged to drive the cam follower at constant speed for constant speed of rotation of the drum casing 31.

The cam surface indicated by 83 in Fig. 15 releases the cam followers 59 under the action of their springs, this surface extending for an angle considerably less than 180°. Since the cam followers are doing no work during their retraction, the shape of the surface 83 is immaterial so long as it permits an easy retracting movement under the action of the retracting springs.

Due to the fact that the cam operating surface 82 extends over a considerably greater angle than 180°, each cam follower begins its driving operation on surface 82 before the other cam follower leaves the cam surface 82. This has the advantage of overcoming all lost motion due to wear in the follower mountings in the three-roll clutches and in the transfer gears for driving the control sleeve 28.

It will be understood that the mechanism is balanced both statically and dynamically. A weight 80 is built into the drum casing 31 to balance the weight due to the auxiliary shafts 64 and 74. Furthermore, the oscillating followers 59 being disposed at equal distances from the main axis are in substantial balance at all times. Furthermore, because the lines of movement of the cam followers 59 are at right angles to and offset from the main axis, the effect of centrifugal force on the cam followers 59 is minimized, thus permitting freer control of the cam followers by their retracting springs.

The operation of the transmission is as follows: Assuming the drive shaft 26 to be rotating at constant speed in the direction indicated by the arrow in Fig. 1. For a one to one speed ratio between drive shaft 26 and driven shaft 27, corresponding to what is known as "high" in automobile terminology, the cam 50 will be moved to its extreme left hand position in Fig. 1 so that it can have no effect on the followers 59. The followers 59 will then be beyond the cam 50 and the springs 63 will cause the followers to move outwardly to their extreme outward positions, limited by the stops 79 engaging the ways 60 (Fig. 6).

Thus the cam followers 59 will rotate with drum casing 31 uninfluenced by the cam, and these cam followers will be stationary with respect to the rotating drum casing 31; the entire planetary transmission will rotate as a unit. There will be no operation of the followers or the one-way clutches, and the worm 77 will not rotate with respect to the worm wheel 78 but will keep the control sleeve 28 locked with respect thereto. Thus in "high" the drive is direct and all wear and tear of the oscillatory parts is eliminated, and the driven shaft is positively connected to the drive shaft, whereby the shafts and connecting members rotate as a unit in two ball bearings only.

To obtain "zero" speed of the driven shaft 27, or "neutral", the control cam 50 will be moved until the followers 59 engage the step 56. This will cause the followers 59 to oscillate back and forth, as they rotate with the drum 31, allowing the control sleeve 28 to rotate in the same direction as the drive shaft 26 with relation to the stationary housing but at a slower speed than the drive shaft. The control sleeve is thus allowed to drop back sufficiently to compensate for the effect of the movement of the drive shaft on the planetary system, causing the driven shaft 27 to remain stationary.

For all intermediate speeds between "high" and "neutral", the cam 50 will be moved to such a position that the followers 59 cooperate with that part of the cam surface indicated by 57. The followers 59 will be operated to a more or less extent depending upon the particular part of the surface 57 they engage. Thus, an infinite number of different speed ratios may be obtained between high and neutral depending on the position of control cam 50.

For "reverse" the control cam 50 will be adjusted so that the followers 59 engage some part of the surface 54 or 55. Step 54 indicate the maximum reverse speed, while surface 55 corresponds to speed ratio infinitely variable between neutral and maximum reverse speed.

The engagement of the followers 59 with reverse surfaces 54 or 55 causes a still greater operation of the oscillatory parts with respect to the drum casing 51 than is obtained in "neutral", allowing the control sleeve 28 to drop back to a sufficiently lesser speed than said drive shaft 26 to cause the driven shaft 27 to rotate backwards with respect to the drive shaft 26.

It will be understood that the auxiliary driving apparatus mounted on drum casing 31, when operated by the followers 59, causes the control sleeve 28 to rotate in an opposite direction relative to the motion of the drive shaft 26 to which the drum casing 31 is secured. Thus, the higher the speed of the control shaft 28 relative to the drum casing 31, the less the absolute speed of the control shaft 28 relative, to the stationary housing. But the direction of rotation of the control 28 is always the same as that of drive shaft 26 at all speeds of the driven shaft 27.

Thus, a speed change device has been described which will give an infinite number of speed ratios between driving and driven shafts both between zero speed and full speed ahead and between zero speed and limited speed in reverse, but which, with suitable modification, may be arranged to provide a speed ratio infinitely variable between zero speed and full speed in reverse. Furthermore, the parts are so arranged that all of the auxiliary vibratory gearing is entirely cut out when in high. Thus the entire transmission rotates as a unit in high with a minimum of friction, making the transmission especially good for installations where the machine travels in high by far the greater part of the time, as in automobile work.

The provision of an irreversible worm and worm wheel drive 77, 78 puts the control sleeve 28 under the influence of the cam 50, but prevents any forces impressed upon the control sleeve 28 from the planetary gearing from influencing the one-way clutches and associated mechanism.

It will, furthermore, be noted that the followers 59 are arranged on opposite sides of the main axis so that the gearing is always substantially balanced at all speeds. Furthermore, the angle of the followers 59 with respect to the surface of the cam is such that the push exerted on the followers has a component in such a direction as to overcome the force of friction exerted by the rollers 58, thereby freeing to a great extent the sliding action between the followers 59 and the rollers 61.

The speed change mechanism is comparatively inexpensive to make, being made up largely of standard parts. The control both as to the speed and to the direction of the driven shaft is obtained very simply by adjusting the position of the control cam. This control cam may be adjusted by hand or it may be adjusted by suitable automatic devices responsive to the speed, or inertia, or other condition of the automobile engine or to other suitable devices. The transmission is particularly useful for use with automobiles and with any other types of machinery requiring infinitely variable speed control.

The use of the overlapping cam action is important in obtaining smooth driving. Each cam follower goes into driving operation before the other cam follower discontinues its driving operation. The cam follower operating surface 82 may be shaped so as to impart a constant linear speed to the followers 59 while driving the transfer gears, the worm and worm wheel, with constant angular speed of the drum casing 31. Thus with the drive shaft 26 rotating at constant speed, a constant speed will also be imparted to the driven shaft 27 at all intermediate speeds under the control of the cam 50.

While certain novel features of the invention have been disclosed and are pointed out in the annexed claims, it will be understood that various omissions, substitutions and changes may be made by those skilled in the art without departing from the spirit of the invention.

What is claimed is:

1. In a speed change transmission device, a first shaft, a second shaft, a carrier driven by said first shaft, a pair of reciprocatory racks mounted on said carrier, a stationary cam member having a cam surface variable axially to impress different throws on said racks, means for axially moving said cam member to adjust the speed ratio, an auxiliary shaft journalled in said carrier and carrying pinions engageable with said racks, separate, one-way, oppositely acting clutches driven by said pinions, respectively, a transfer device, driven by said clutches in a single direction, and an irreversible drive connecting said transfer device and said second shaft.

2. In a speed change transmission device, a first shaft, a second shaft, a casing driven by said first shaft, a pair of reciprocatory racks slidably mounted in said casing, the lines of movement of said racks being perpendicular to said first shaft and spaced symmetrically about the axis thereof, a stationary cam member having a variable cam surface whose shape in section is variable axially to impress different throws on said racks, means for axially moving said cam member to adjust the speed ratio, an auxiliary shaft journalled in said casing and carrying pinions engageable with said racks, transfer gears also carried by said auxiliary shaft, separate one-way clutches connecting said pinions and said transfer gears, a worm shaft journalled in said casing and having second transfer gears meshing said first transfer gears, a worm on said worm shaft, and a worm wheel on said second shaft meshing said worm.

3. In a speed change transmission device, a drive shaft having an internal gear thereon, a driven shaft having a pinion thereon, a control sleeve surrounding said driven shaft, said control sleeve carrying a planetary support, planet gears on said planetary support engaging respectively said internal gear and said pinion, a casing driven by said drive shaft, a pair of reciprocatory racks slidably mounted in said casing, the lines of movement of said racks being perpendicular to the main axis and spaced symmetrically thereabout, a stationary cam member having a variable cam surface engaging said rack members, means for axially moving said cam member to adjust the speed ratio, an auxiliary shaft journalled in said casing and carrying pinions engageable with said racks, transfer gears also carried by said auxiliary shaft, separate one-way clutches connecting said pinions and said transfer gears, a worm shaft journalled in said casing and having second transfer gears meshing said first transfer gears, a worm on said worm shaft, and a worm wheel on said control shaft meshing said worm.

4. In a speed change transmission device, a drive shaft, a driven shaft and a control shaft, planetary gearing between said shafts, a carrier driven by said drive shaft, a pair of reciprocatory racks mounted on said carrier, a stationary cam member having a cam surface variable axially to impress different throws on said racks, means for axially moving said cam member to adjust the speed ratio between driving and driven shafts, an auxiliary shaft journalled in said carrier and carrying pinions engageable with said racks, separate one-way clutches driven by said pinions, a transfer device driven by said clutches in a single direction, and an irreversible drive connecting said transfer device and said control shaft.

5. In a speed change transmission device, a drive shaft, a driven shaft and a control shaft, planetary gearing between said shafts, a carrier driven by said drive shaft, a pair of reciprocatory racks mounted on said carrier, a stationary cam member having a cam surface variable axially to impress different throws on said racks, means for axially moving said cam member to adjust the speed ratio between driving and driven shafts, an auxiliary shaft journalled in said carrier and carrying pinions engageable with said racks, a worm shaft journalled in said carrier, means including separate one-way clutches connecting said pinions and said worm shaft, a worm on said worm shaft, and a worm wheel on said control shaft meshing said worm.

6. In a speed change transmission device, a drive shaft, a driven shaft and a control shaft, all on a common axis, planetary gearing between said shafts, a carrier driven by said drive shaft, a pair of reciprocatory racks slidably mounted on said carrier, the lines of movement of said racks being perpendicular to the main axis and spaced symmetrically thereabout, a stationary cam sleeve having an internal cam surface shaped in section to impart uniform motions to said racks but variable axially to impress different throws on said racks, means for axially moving said cam member to adjust the speed ratio between driving and driven shafts, an auxiliary shaft journalled in said carrier and carrying pinions engageable with said racks, transfer gears also carried by said auxiliary shaft, separate one-way clutches connecting said pinions and said transfer gears, a worm shaft journalled in said carrier and having second transfer gears meshing said first transfer gears, a worm on said worm shaft, and a worm wheel on said control shaft meshing said worm.

7. In a speed change device, a first shaft, a second shaft, planetary transmission connecting said shafts, a control shaft for controlling said planetary transmission, a rotary support secured to said first shaft, auxiliary mechanism on said support, stationary devices cooperating with said auxiliary mechanism to drive said control shaft with respect to said first shaft for intermediate speeds between said first and second shafts, means for withdrawing said stationary devices from engagement with said auxiliary mechanism, whereby said control shaft and said support rotate as a unit and said auxiliary mechanism is relatively stationary with respect thereto for direct drive between said first and second shafts.

8. In a speed change device, a first shaft, a second shaft, planetary transmission connecting said shafts, a control shaft for controlling said planetary transmission, a rotary support driven by said first shaft, auxiliary mechanism on said support, stationary devices cooperating with said auxiliary mechanism to drive said control shaft for intermediate speeds, means for withdrawing said stationary devices from engagement with said auxiliary mechanism whereby said control shaft and said support rotate as a unit and said mechanism is relatively stationary with respect thereto for direct drive between said first and second shafts.

9. In a speed change transmission device, a first shaft, a control shaft, planetary gearing connecting said shafts, a carrier driven by said first shaft, a series of reciprocatory followers mounted on said carrier, a stationary cam member having a cam surface variable axially to impress different throws on said followers, means for relatively moving said cam member and followers in an axial direction to adjust the speed ratio, transfer mechanism connecting said followers and control shaft and comprising separate overriding clutches journalled on said carrier and driven respectively by said followers, an irreversible drive driven by said overriding clutches and connected to said control shaft, the high and low points on said cam being so related to said followers that each follower takes up its share of the load before the preceding follower releases its share.

10. In a speed change transmission device, a first shaft, a second shaft, a control shaft, planetary gearing connecting said shafts, a carrier driven by said first shaft, a series of reciprocatory followers mounted on said carrier, a stationary cam member having a cam surface variable axially to impress different throws on said followers, means for relatively moving said cam member and followers in an axial direction to adjust the speed ratio, transfer mechanism connecting said followers and said control shaft and comprising separate overriding clutches journalled on said carrier and driven respectively by said followers, and an irreversible drive driven by said overriding clutches and connected to said control shaft, said cam member varying axially in eccentricity from a substantially true circle to maximum throw.

11. In a speed change transmission device, a first shaft, a second shaft, a control shaft, planetary gearing connecting said shafts, a carrier driven by said first shaft, a series of reciprocatory followers mounted on said carrier, a stationary cam member having a cam surface variable axially to impress different throws on said followers, means for relatively moving said cam member and followers in an axial direction to adjust the speed ratio, transfer mechanism connecting said followers and said control shaft and comprising separate overriding clutches journalled on said carrier and driven respectively by said followers, and an irreversible drive driven by said overriding clutches and connected to said control shaft, said cam member varying in eccentricity from a substantially true circle to maximum throw, the circumferential contour at all transverse sections being similar and being such as to impart substantially uniform velocity to said control shaft, the high and low points on said cam being so related to said followers that each follower takes up its share of the load before the preceding follower releases its share.

WILLIAM HORACE JOHNSON.